(12) United States Patent
Schuster et al.

(10) Patent No.: US 7,817,159 B2
(45) Date of Patent: Oct. 19, 2010

(54) DIGITAL PAINTING

(75) Inventors: Michael D. Schuster, San Jose, CA (US); Gregg D. Wilensky, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 160 days.

(21) Appl. No.: 10/910,013

(22) Filed: Aug. 3, 2004

(65) Prior Publication Data

US 2005/0001854 A1 Jan. 6, 2005

Related U.S. Application Data

(63) Continuation of application No. 09/299,294, filed on Apr. 26, 1999, now Pat. No. 6,870,550.

(51) Int. Cl.
*G09G 5/00* (2006.01)
(52) U.S. Cl. .................. 345/582; 345/581; 345/442; 345/443
(58) Field of Classification Search .................. None
See application file for complete search history.

(56) References Cited

U.S. PATENT DOCUMENTS

| | | | |
|---|---|---|---|
| 4,956,872 A | 9/1990 | Kimura | 382/283 |
| 5,182,548 A | 1/1993 | Haeberli | 345/113 |
| 5,325,477 A | 6/1994 | Klassen | |
| 5,347,620 A | 9/1994 | Zimmer | 101/492 |
| H1506 H | 12/1995 | Beretta | 345/591 |
| 5,500,925 A | 3/1996 | Tolson | 345/431 |
| 5,513,991 A | 5/1996 | Reynolds et al. | 434/81 |
| 5,611,036 A | 3/1997 | Berend et al. | 345/441 |
| 5,646,650 A | 7/1997 | Miller et al. | 345/179 |
| 5,767,857 A * | 6/1998 | Neely | 345/427 |
| 5,784,301 A | 7/1998 | Guo et al. | 703/6 |
| 5,828,819 A | 10/1998 | Do et al. | 345/604 |
| 5,835,086 A | 11/1998 | Bradstreet et al. | 345/16 |
| 5,844,565 A | 12/1998 | Mizutani et al. | 345/581 |
| 5,847,712 A | 12/1998 | Salesin et al. | 345/430 |
| 5,852,673 A | 12/1998 | Young | |
| 5,870,091 A | 2/1999 | Lazarony, Jr. et al. | 345/346 |
| 5,909,220 A | 6/1999 | Sandow | 345/589 |
| 5,940,081 A | 8/1999 | Guo et al. | 345/442 |

(Continued)

FOREIGN PATENT DOCUMENTS

EP 0 678 831 A2 10/1995

(Continued)

OTHER PUBLICATIONS

Title: Painterly Rendering with Curved Brush Strokes of Multiple Sizes, Author: Aaron Hertzmann, pp. 8, date: 1998, Publisher: ACM Press, ISBN:0-89791-999-8.*

(Continued)

*Primary Examiner*—Kee M Tung
*Assistant Examiner*—Jwalant Amin
(74) *Attorney, Agent, or Firm*—Fish & Richardson P.C.

(57) ABSTRACT

A user identifies an area of a digital canvas. Color gradients are determined based on a corresponding area on a reference. Brush strokes are applied in the area of the digital canvas, the brush strokes having trajectories based on the color gradients.

27 Claims, 7 Drawing Sheets

U.S. PATENT DOCUMENTS

| | | | | |
|---|---|---|---|---|
| 5,986,665 | A | | 11/1999 | Wrey et al. ................. 345/581 |
| 5,999,190 | A | * | 12/1999 | Sheasby et al. ............. 345/589 |
| 6,011,536 | A | | 1/2000 | Hertzmann et al. ......... 345/112 |
| 6,067,094 | A | | 5/2000 | Schuster ..................... 345/441 |
| 6,226,000 | B1 | | 5/2001 | Richens et al. .............. 345/419 |
| 6,239,803 | B1 | | 5/2001 | Driskell ....................... 345/810 |
| 6,298,489 | B1 | | 10/2001 | Cox ........................... 2/161.6 |
| 6,304,677 | B1 | | 10/2001 | Shuster |
| 6,329,990 | B1 | | 12/2001 | Silverbrook et al. ........ 345/589 |
| 6,333,752 | B1 | * | 12/2001 | Hasegawa et al. ........... 715/764 |
| 6,337,925 | B1 | | 1/2002 | Cohn et al. |
| 6,456,297 | B1 | | 9/2002 | Wilensky |
| 6,628,295 | B2 | | 9/2003 | Wilensky |
| 7,062,500 | B1 | * | 6/2006 | Hall et al. ................... 707/102 |

FOREIGN PATENT DOCUMENTS

| | | | |
|---|---|---|---|
| EP | 0 854 637 A2 | | 7/1998 |
| EP | 0 881 597 A2 | | 12/1998 |
| JP | 05342412 A | * | 12/1993 |
| JP | 8-44867 | | 2/1996 |
| JP | 11-53508 | | 2/1999 |

OTHER PUBLICATIONS

Title: Painterly rendering with curved brush strokes, Aaron Hertzmann, Presented by Ran Chen, pp. 4 http://www.cs.mcgill.ca/~cs767/student_pres/ran_hertzmann.pdf, Jan. 2005.*
Title: Orientable textures for image-based pen-and-ink illustration; Author: Wong et al.; Year of Publication: 1997; pp. 1-6.*
Curtis et al., "Computer-Generated Watercolor", *Computer Graphics Proceedings*, 1997, pp. 421-430.
Haeberli, "Paint by Numbers: Abstract Image Representations", *Computer Graphics*, vol. 24, No. 4, Aug. 1990, pp. 207-214.
Hertzmann, "Painterly Rendering With Curved Brush Strokes of Multiple Sizes", *Computer Graphics Proceedings*, 1998, pp. 453-460.
Litwinowicz, "Processing images and video for an impressionist effect", *Proceedings of the $24^{th}$ annual conference on Computer graphics and Interactive techniques*, Aug. 1997, pp. 407-414.
Meier, "Painterly Rendering for Animation", *Computer Graphics Proceedings*, 1996, pp. 477-484.
Salisbury et al., "Interactive pen-and-ink illustration", *Proceedings of the $21^{st}$ annual conference on Computer graphics and interactive techniques*, Jul. 1994, pp. 101-108.
Salisbury et al., "Orientable Textures for Image-Based Pen-and-Ink Illustration", *Computer Graphics Proceedings*, 1997, pp. 401-406.
Aizawa, Japanese Patent Office, Office action in corresponding JP 2000-125221 mailed Jun. 23, 2009, 7 Pages.
Hoshino, Adobe PhotoDeluxe, Mac Fan Graphics Mac Fan Special Edition, Japan, K.K. Mainichi Communications, Feb. 18, 1999, 3 pages.
Matsumoto, "Digital Photoschool: Number 25 Art by Digital Cameras" Windows Start, Japan, K.K. Mainichi Communications, Dec. 29, 1997, vol. 3, No. 2, 3 pages.
Shiraishi, et al. "An Approach to a Painterly Rendering Method based on the Analyses of Features of Existing Oil Paintings", Information Processing Society Research Report 98-CG-91, Japan, Information Processing Society, Inc. Aug. 28, 1998, vol. 98, No. 76, 7 pages.

* cited by examiner

DIGITAL PAINTING

CROSS REFERENCE TO RELATED APPLICATIONS

Pursuant to 35 U.S.C. § 120, this application is a continuation of prior U.S. application Ser. No. 09/299,294, filed Apr. 26, 1999 now U.S. Pat. No. 6,870,550. The contents of the prior application is incorporated herein by reference in its entirety.

BACKGROUND

Some painting programs allow an existing digital image to be rendered in a selected style. For example, Adobe Photoshop 5.0 offers filters that apply artistic styles, such as simulated watercolor, pastel, dry brush, or fresco, to a digital image. Photoshop and other programs, such as Xaos Tools' Paint Alchemy, also enable the application of brush styles in rendering an image. These filters and effects apply algorithms uniformly (possibly with some randomness) to all parts of the image.

Another painting program, Fractal Design's Painter 5.0, allows a user to apply realistic-looking brush strokes to a digital canvas. The strokes are applied in much the same way that a painter would brush paint on a canvas. The user may create almost any painting that he is capable of drawing. To create a good painting, the user must have artistic ability.

A variety of other approaches to rendering painterly images have been used and proposed. For example, fluid brush strokes may be automatically applied to an entire image in a selected painting style. In another technique, a grayscale image may be converted into a pen-and-ink style line drawing by allowing interactive modification of image tone (lightness, darkness) and a line stroke direction field. In a different approach, realistic watercolor brush marks may be applied to a digital image automatically based on an initial painting condition specified by a user. In another system, parametric surfaces may be rendered in pen and ink based on a three-dimensional model of objects to be rendered.

SUMMARY

In general, in one aspect, the invention features a method that includes enabling a user to identify an area of a digital canvas, determining color gradients based on a corresponding area on a reference, and applying brush strokes in the area of the digital canvas, the brush strokes having trajectories based on the color gradients.

In general, in another aspect, the invention features enabling a user to indicate an area of a digital canvas by performing an action using a user interface device, and applying multiple brush strokes in the area of the digital canvas in response to performance of the action, the brush strokes being based on color information contained in a corresponding area of a reference.

Implementations of the invention may include one or more of the following features.

Reference colors may be determined based on a corresponding area on a reference, and the brush strokes may have colors based on the reference colors. The reference colors and color gradients may be based on a blurred version of the corresponding area of the reference. The brush strokes may be applied selectively based on color differences between the area of the canvas and the corresponding area of the reference. The user may specify a style (e.g., an historical painting style) for the brush strokes. The brush strokes may be applied only when the application of strokes would produce a smaller color difference between the area of the canvas and the corresponding area of the reference. The brush stroke may be oriented generally in a direction of an edge identified by the gradient.

The user may identify an area on a digital canvas and a palette of colors based on a corresponding area on a reference. The brush stroke may have colors based on the palette. The size and/or an opacity of paint applied by brush strokes may depend on pressure applied in a pressure sensitive pointing device.

The user may specify different brush stroke styles for different regions of the canvas.

The brush stroke may be stopped when both the stroke exceeds a minimum length and a continuing stroke would increase the difference between the canvas and the reference.

The reference may have a different size and/or shape from the canvas and areas of the reference may be mapped to areas of the canvas based on user choices.

Among the advantages of the invention are one or more of the following.

A user is able to interactively create a digital image having a hand-painted appearance. For example, a digitized photograph may be used to create a digital painting quickly. The user retains a high degree of artistic control over the painting process. The resulting digital painting is fluid, non-uniform, and individualized. The brush strokes are applied intelligently and automatically. A useful balance is struck between manual painting and automatic brush stroke generation.

The user thus has a significant degree of control over each portion of the image while not being required to create each brush stroke individually. The combination of multiple brush strokes with intelligent placement of each stroke (based on characteristics of the underlying image) enables use of the image to create a digital painting quickly.

The user may control styles within different portions of the digital painting and at the same time take advantage of algorithms that automate the generation and placement of brush strokes. The preexisting image guides the application of brush strokes. Multiple brush strokes may be applied at one time. For each path of the motion of the cursor, the program can lay down large numbers of brush strokes.

Both grayscale and color digital images may be processed. A variety of painting styles may be used.

Other features and advantages of the invention will become apparent from the following description and from the claims.

DESCRIPTION

The Canvas and the Reference Image

Using an appropriately configured digital painting system, a user can interactively create a custom digital painting that resembles a painterly version of an original digital image. By digital image, we mean a collection of digital information that may be cast into a visual image. By painterly, we mean that the digital painting gives the impression of having been created by brush strokes applied to a surface. Moeover, as will be appreciated, a digital painting system can include a machine (e.g., a personal computer) and a non-transitory medium (e.g., a storage disk) bearing instructions to cause the machine perform the operations described herein.

Figure 1:
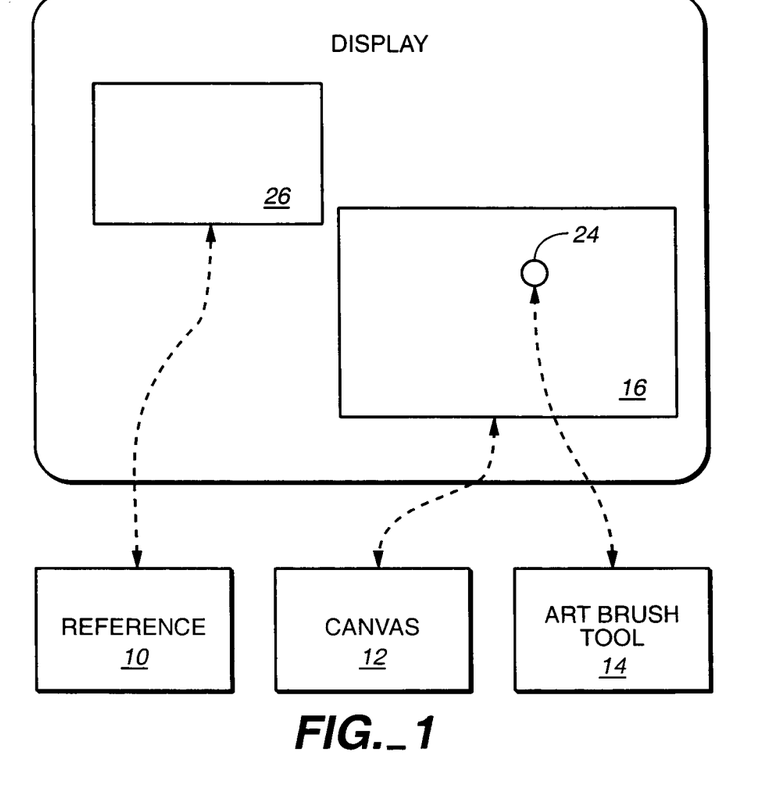
FIG. 1 is block diagram of aspects of a digital painting system.

As seen in FIG. 1, the user creates the painting using a reference 10, a canvas 12, and an art brush tool 14, all of which could be implemented as additional features of a painting program such as Adobe Photoshop.

The reference is stored data that represents an original digital image selected by the user. The reference could be any digital image that can be imported into the paint program being used, for example, a photograph, artwork, a document, or a web page. The reference could be obtained from a digital camera, digital video, a scanner, a fax, or other source. In the case of Adobe Photoshop, the selection of a reference is enabled using the history feature.

Once selected, the reference is not changed. However, the user could change reference images in later stages of painting. For example, after getting to a certain point in painting, he could replace the reference image with the canvas in its present state and then do further work on the canvas relative to that newly stored reference.

The reference could be a different size and/or shape from the canvas. Then areas of the reference could be mapped to areas of the canvas by a simple linear scaling operation. Alternatively, the user could choose to suppress the scaling and instead indicate a point on the canvas that is to correspond to a given point (e.g., the upper right corner) on the reference.

The user paints on a displayed canvas 16 that represents the stored digital canvas 12. (In the display of FIG. 1, menus, palettes, and other controls are not shown for simplicity.) The canvas 12 is updated as the user works so that it always represents the current state of the digital painting that is being created. The user paints by clicking or dragging a cursor 24 representing the art brush tool 14. The art brush tool may be thought of as software that implements the features of an art brush. The art brush could be included, for example, in the tool palette of Adobe Photoshop.

Before starting to paint, the user also chooses an initial canvas separately from his choice of a reference.

The initial canvas typically is filled with a white background but the canvas could have any fill or begin with any image, including the reference. When the initial canvas is a copy of the reference, the user has the impression of painting on the reference. Nevertheless, the reference, which is maintained separately from the canvas, does not change. In another mode of operation, the reference may be displayed in a subdued color palette beneath the canvas brush strokes. The reference becomes less and less visible as it is covered by new brush strokes.

If the user interrupts painting and saves a partially painted canvas, he can begin a new session by opening a reference (either a reference that had been previously used or a different one) and the partially painted canvas for additional painting.

The canvas must be open and displayed during painting. The reference may, but need not, be displayed at the same time in a separate window 26. Even when the reference is not being displayed, it continues to be maintained in its original form.

The art brush applies paint to the canvas as brush strokes that make the canvas look like a painterly version of the reference.

The user may apply brush strokes to previously unpainted parts of the canvas or to previously painted parts of the canvas. The user need not paint each brush stroke separately. Rather, the user's role is to make choices about the style and characteristics of brush strokes and to indicate, by clicking and dragging the art brush, the places and the sequence in which multiple of brush strokes that reflect both his choices and the characteristics of the reference are automatically laid down. When the user clicks or drags, brush strokes may or may not be painted in the vicinity of each art brush position based on conditions discussed later.

Factors that Affect the Brush Strokes

In addition to the position of the art brush, several factors control the generation of brush strokes in response to dragging and clicking, including:

choices about brush strokes made by a user prior to clicking or dragging.

characteristics of pixels of the reference in the vicinity of the art brush cursor location.

determinations made by software, including whether and how many brush strokes should be generated.

User Choices About Brush Strokes

User choices are made in an options palette 50 (FIG. 2) that is provided by the art brush tool software. The options palette, like options palettes for other features of Adobe Photoshop, lets the artist control behavioral aspects of the art brush.

Figure 2:
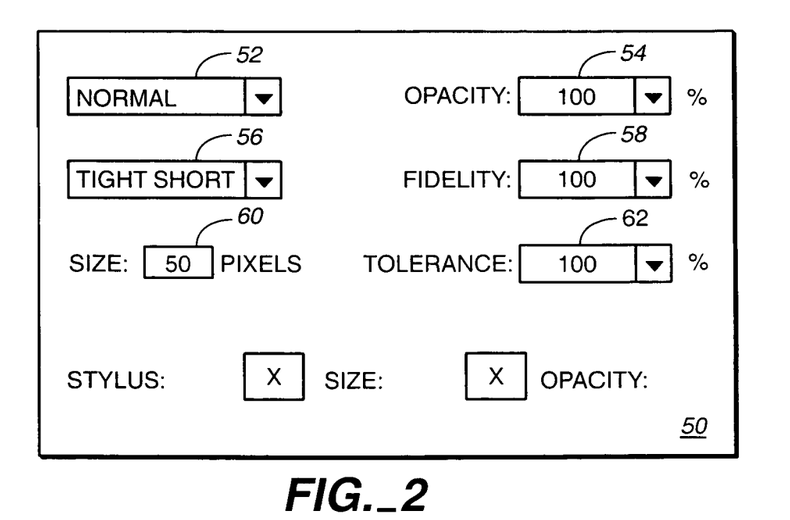
FIG. 2 is a displayed options palette.

The top line of the palette contains a blending mode control 52 and an opacity control 54. Blending mode 52 controls aspects of the paint applied to the canvas. The blending mode choices include normal, lighter, darker, hue, saturation, color, luminance, and other options that work in the same way as similar options available for Photoshop's regular paint brush tool. Any mode other than normal modifies how paint is applied to the canvas.

Opacity 54 controls the opacity or transparency of the applied paint. A number less than 100% causes paint to be applied translucently, somewhat like a wash of watercolor.

On the second line of the palette are a style control 56 and a fidelity control 58.

Style 56 controls the shape of the strokes applied by the art brush. In one implementation, a variety of possible styles are organized in four categories: tight, loose, dab, and curl. The strokes include tight short, tight medium, tight long, loose medium, loose long, dab, tight curl, loose curl, and so on. Tight strokes (of various lengths) are aligned rather tightly with edges of objects that are identified in the reference. Loose strokes follow the edges less faithfully and give the painting a more abstract look. Dab strokes are dabs of paint; a stroke consists of one dab. Curl strokes—somewhat Van Gogh-like—start along an edge of the reference and then curl away from the edge. The tightness or looseness of the curls can be selected, as well as their average length, by choosing an appropriate one of the available styles.

By selecting brush styles, the user may, for example, cause brush strokes on a flower basket to be rendered with a broad brush (impressionist) style and the brush strokes for the flowers to be rendered with a shorter brush (expressionist or pointillist) style. Thus, available styles may mimic the impressions of historical styles. In addition to the style selection arrangement discussed above, in another implementation, the system provides an interface by which the user can create custom styles, either based on existing styles or from scratch.

Fidelity 58 controls the art brush's selection of color that is based on the reference in the vicinity of the cursor location and is used in the brush strokes applied to the canvas. With fidelity set to a value less than 100%, art brush adds random variation to the color it uses to paint. The smaller the fidelity value, the more randomness. The randomness helps to give the painting a more hand-painted look.

The third row of the palette includes a size control 60 and a tolerance control 62.

Figure 3:
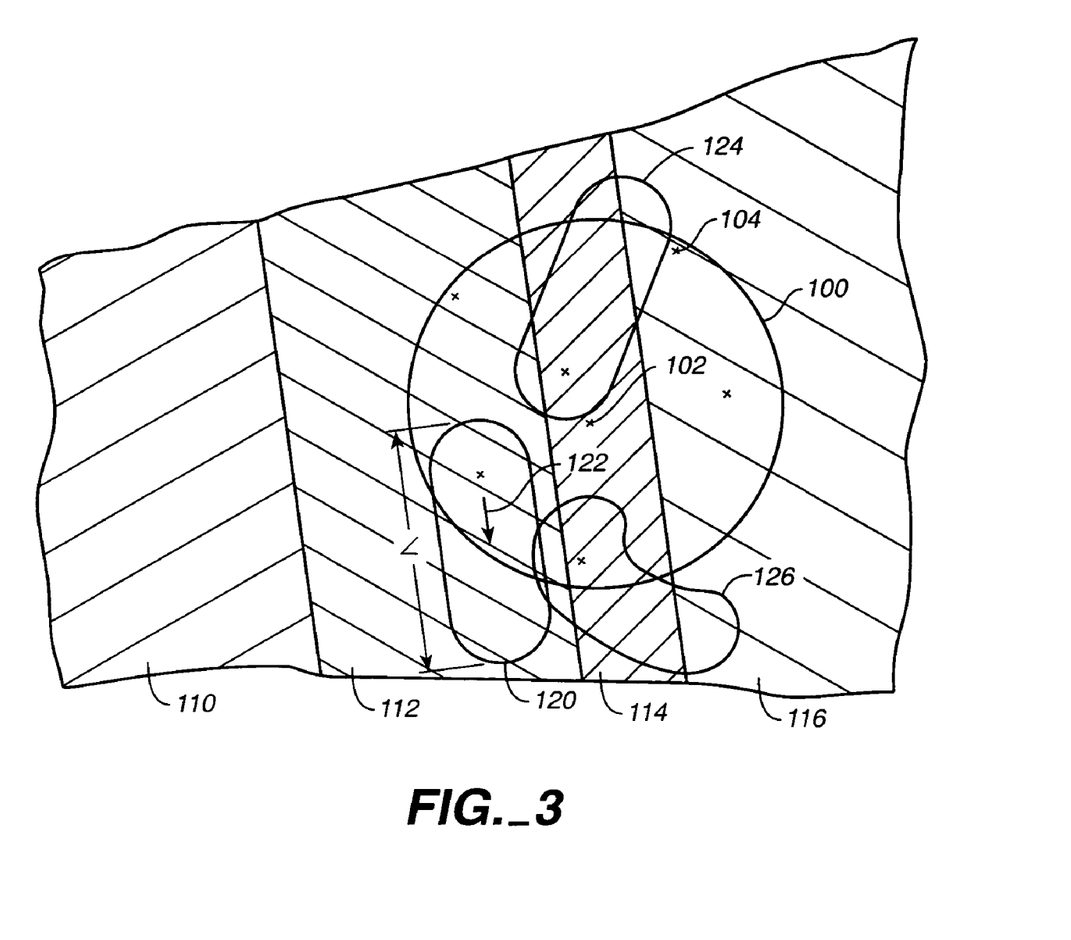
FIG. 3 is a portion of a digital canvas.

Size 60 controls how much paint is applied in a brush stroke. As seen in FIG. 3, when the cursor is clicked or dragged, the art brush applies paint in brush strokes within, for example, a circle 100 centered on the cursor position 102 and with a radius equal to the value of the size parameter. Larger values of size allow a user to apply lots of paint easily over a larger area. Smaller size values let the user apply paint more specifically. If size is zero, only one stroke will be painted, beginning at the cursor position.

Tolerance 62 controls whether and how often the art brush applies paint brush strokes. With a large tolerance, the canvas and the reference must mismatch in the vicinity of the cursor by a large amount (as explained below) before paint will be applied. Smaller tolerance will cause paint to be applied more often. A zero tolerance will force the art brush to paint even when the canvas and reference match closely.

The bottom line in the options palette has two stylus option check boxes, size 64 and opacity 66. When painting with a pressure sensitive stylus on the surface of an electronic tablet, these options (if set) let the user control brush size or painting opacity, or both, using stylus pressure. If the size box is checked, then pressing harder with the stylus causes the paint strokes to become wider. If the opacity box is checked, then pressing harder with the stylus causes the paint to become more opaque. Both controls may be checked simultaneously. If neither control is "checked", then stylus pressure on the-digital tablet has no effect on the application of paint.

Pressure (or stylus angle) could control also other aspects, including the fidelity, size, or tolerance values in the options palette.

The ability to change brush sizes allows a user to create a rough version on the canvas using a large brush, then to use smaller brushes on already painted areas to add detail to the painting.

Determining whether a Brush Stroke should be Generated

During dragging or clicking, positions within the cursor vicinity (the circle around the cursor location having a radius determined by the size parameter) are candidates for addition of new brush strokes. As seen in FIG. 3, to define possible locations for brush strokes, the art brush fills the circle with a set of grid points 104 that are randomly placed with the average distance between pairs of points roughly equal to the radius of the brush. Each grid point represents a site for painting a possible new brush stroke. Whether the stroke should be painted depends on how closely the canvas matches the reference at that point.

To determine how closely they match, the art brush blurs pixels of the reference that are located within roughly the art brush's radius of each of the grid points. A standard Gaussian blurring is used. The blurred reference pixels are compared with the corresponding set of pixels in the canvas. If the average color difference between the sets of pixels exceeds the tolerance value set in the options palette, then a stroke is started at the grid point, otherwise not. Other image characteristics, such as shape-sensitive measures of image distance, may also be used for matching purposes.

For matching purposes, the color difference is measured as a Euclidean distance in the color space of the canvas and reference. For example, if a canvas pixel has color components $c_1, m_1, y_1, k_1$ and its corresponding blurred reference pixel has components $c_2, m_2, y_2, k_2$, the Euclidean distance is the square root of the sum $(c_1-c_2)*(c_1-c_2)+(m_1-m_2)*(m_1-m_2)+(y_1-y_2)*(y_1-y_2)+(k_1-k_2)*(k_1-k_2)$. The Euclidian distances are added for all pixels within roughly (depending on the painting style) one brush radius of the starting grid point of the candidate brush stroke and the sum is divided by the total number of pixels times the square root of the number of channels in the images (two in this case). The resulting number ranges between zero and one. The number is zero if all pairs of pixels match identically and is one if all pairs ape maximally different. If the number between zero and one is greater than or equal to the tolerance value, the stroke is painted, otherwise not.

Other measures of color closeness could be used, including non-Euclidean measures. For example, closeness can be measured in a different color space from that used to represent the canvas or reference. One might wish to compare hue and/or luminance (brightness) without comparing saturation, for example.

Path of the Brush Stroke

For many styles, each brush stroke has a trajectory that follows along a color gradient contour in the blurred reference. As suggested in FIG. 3, the gradient contours 110, 112, 114, 116 are obtained by generating a black and white version of the blurred reference using standard techniques. The gradient contours essentially provide information about edges between differently colored areas in the reference. Contours of equal brightness within the black and white version are found. From the equal brightness contour at which a brush stroke begins, the stroke 120 is extended in either one of the two possible directions 122 (chosen randomly) along the contour and for some styles continues along the contour much as a cow might walk at a constant elevation along the side of a hill. In other styles, the directions of strokes, though depending on the contour, may not follow it directly, as explained below.

A brush stroke is made up of one or more partially overlapping dabs of paint. The geometry of each dab is specified by a currently selected brush tip. As each dab is painted, the brush tip may be rotated or oriented to be parallel to a tangent to the stroke trajectory. That is, the brush tip may be rotated appropriately to the left or right as the trajectory bends left or right. Brush tip rotation is optional, under control of the current style.

Stopping the Stroke

Brush strokes have minimum and maximum stroke lengths that are determined by the selected painting style. Once the stroke exceeds the minimum length, it may be stopped before reaching the maximum length if continuing the stroke would make the canvas differ more from the blurred reference.

A stroke is started when a significant color difference between the canvas and the blurred reference is found at a particular grid point. Painting a dab of paint, using the color of the blurred reference at that point, will make the canvas match the reference more closely, in general. Additional dabs of this same color along the gradient will usually also make the canvas match the reference more closely along that portion of the gradient. But at some point, painting may make the canvas match less well if more paint were applied. The art brush will stop painting at that point, as long as the minimum stroke length criteria is satisfied.

The stroke will be stopped also based on the maximum length criteria, independent of color matching.

Color and Opacity of the Brush Stroke

The color of each brush stroke is based on the color of the blurred reference in the vicinity of the candidate grid point in the area of mismatch. The brush color may be based on an interpolation between the color of the blurred reference and the color of the canvas in the area of mismatch. Brush color may be constant for a given brush stroke or may vary along the stroke. The color along the stroke could be based on an interpolation between the color of the blurred reference in the original area of mismatch and the varying, existing colors of the canvas along the stroke's trajectory.

Automatic Resetting of Parameters

In addition to being set manually, the brush size could be reset automatically to guide a novice user. For example, the brush size could be reduced each time the user again paints in a previously painted region of the canvas. A sequence of values of other brush parameters could also be stored. Each time the user clicks the art brush or stops dragging the cursor, the next values in the parameter sequences replace the prior ones with respect to the next painting step.

Example Brush Styles

Examples of brush styles are illustrated by the pseudo-code set forth below. All of the illustrated styles are built on a base_style. The three tight styles differ in their minimum and maximum stroke lengths. The loose styles also differ in their stroke length. The loose styles exhibit a non-zero brush_inertia that operates as would a cow that cannot turn too tightly to follow the contour of a hillside and so drifts off the correct contour as suggested by stroke 124 in FIG. 3. The result is a more abstract painting. The dabs are short strokes (zero length) that are spaced more closely to one another within the circle defined by the size control value. The curly styles don't follow the contour; they curl away from it with a curliness that decreases along the strokes as suggested by stroke 126 in FIG. 3, under control of the two curliness values. Parameters that define a style could include brush size, shape, length, and coverage area, spacing, smoothness, curvature, translucency, texture, paint thickness, and rendering mode (e.g., transparent, opaque).

```
void art_brush::style::base_style( ) {
    brush_coverage = 25.0;
    brush_spacing = 1.0;
    brush_size = 1.0;
    grid_spacing = 1.0;
    brush_inertia = 0.0;
    gradient_jitter = 0.1;
    min_stroke_length = 0.0;
    max_stroke_length = 0.0;
    stroke_begin_curl = 0.0;
    stroke_end_curl = 0.0;
    rotate_brush = false;
    lightness_jitter = 0.0;
    chroma_jitter = 0.0;
    color_tolerance = 0.2;
    reference_radius = 1.0;
    reference_sigma = 1.0/3.0;
    max_reference_size = 25;
    max_grid = 75;
}
void art_brush::style::tight_short_style( ) {
    base_style( );
    min_stroke_length = 1.0;
    max_stroke_length = 3.0;
}
void art_brush::style::tight_medium_style( ) {
    base_style( );
    min_stroke_length = 4.0;
    max_stroke_length = 7.0;
}
void art_brush::style::tight_long_style( ) {
    base_style( );
    min_stroke_length = 8.0;
    max_stroke_length = 15.0;
}
void art_brush::style::loose_medium_style( ) {
```

-continued

```
    base_style( );
    brush_inertia = 0.8;
    min_stroke_length = 4.0;
    max_stroke_length = 7.0;
}
void art_brush::style::loose_long_style( ) {
    base_style( );
    brush_inertia = 0.8;
    min_stroke_length = 8.0;
    max_stroke_length = 15.0;
}
void art_brush::style::dab_style( ) {
    base_style( );
    grid_spacing = 0.75;
}
void art_brush::style::loose_curl_style( ) {
    base_style( );
    grid_spacing = 1.5;
    brush_inertia = 1.0;
    gradient_jitter = 0.0;
    min_stroke_length = 12.0;
    max_stroke_length = 24.0;
    stroke_begin_curl = 0.10;
    stroke_end_curl = 0.0;
}
void art_brush::style::tight_curl_style( ) {
    base_style( );
    grid_spacing = 1.5;
    brush_inertia = 1.0;
    gradient_jitter = 0.0;
    min_stroke_length = 12.0;
    max_stroke_length = 24.0;
    stroke_begin_curl = 0.20;
    stroke_end_curl = 0.0;
}
```

Associating Styles with Regions

Different regions of a painting may be associated with different respective painting styles. The associations of painting styles with regions may be defined manually by the user during the course of painting by choices made before dragging or clicking operations. Alternatively, the associations may be set in advance by having the user identify regions of interest and associated styles and then either allowing the user to paint the regions with the selected styles or automatically applying the selected styles to all parts of the selected regions. Multiple regions of the reference may be selected by a selection brush tool.

The user may construct a mask with the normal painting tools. A mask assigns a number between 0 and 1 to a subset of pixels of the canvas. A selected paint style is applied to all pixels in the mask. The mask's pixel values control the value of the mask's associated style control. The 0 value simply specifies the minimum valid numerical value of the mask's style control. Similarly, a value of 1 specifies the maximum control value. Intermediate mask values correspond to intermediate control values. The user associates a specific numerical control (e.g., opacity or fidelity) in the style palette with the mask.

When painting a stroke on the canvas with an associated mask, the average value of the mask in the area of the stroke or part of the stroke determines the value of the associated control in the style palette to be used by that stroke, or by that part of the stroke.

The user could choose a style (e.g., by 'dipping' the brush into the style icon or by selecting a style icon or menu item and then painting). Multiple styles could be applied by painting onto the image. If more than one style is applied to a given pixel, an interpolated style may be used in which each parameter value that makes up the style is an average of the parameters from each style. A default style is provided for any region in which the user has not chosen another style. When averaging (interpolating) styles, any associated masks could be used to control the weighted averaging of the style values.

Alternatively, determination of styles for different regions may be done automatically by a segmentation algorithm that divides the image into distinct regions, measures image characteristics in each region, and selects styles based on the measurements.

The image characteristics that may be measured for this purpose include first-order measures such as the average color of pixels in the region, the standard deviation of colors of pixels in the region, or higher moments of the colors.

For example, chrominance or luminance jitter can be added to brush strokes in proportion to the standard deviation of colors in the region, thus allowing the brush strokes to intelligently reflect the color distribution in the image.

The measures could include second-order statistics which quantify, for a color at pixel location r, the probability of having some other color at a location displaced by some amount dr. Texture measures can be derived from combinations of the statistics. These texture measures can be used to set the brush texture or brush jitter, for example.

Region associations and masks would be saved each time the canvas is saved.

Palette Constraints

The application of paint to the canvas may also take account of predefined color palettes. For example, the actual color palette of the reference or of a portion of the reference in the vicinity of the grid point may be constructed by evaluating pixels. Then the colors of the painted pixels of the brush stroke may be constrained to those in the color palette or to combinations of those colors, so that added paint strokes do not use palettes that conflict with the palettes of the reference. The brush strokes could also be constrained on the basis of a palette defined by or selected by the user. For example, an image could be rendered in warm (tending toward reds and yellows) tones by choosing a 'warm' palette. Or it could be rendered using a pre-stored palette of a famous artist. For example, a Rembrandt palette would have browns, ochres, and few bright colors.

Sample Digital Paintings

Figure 4:
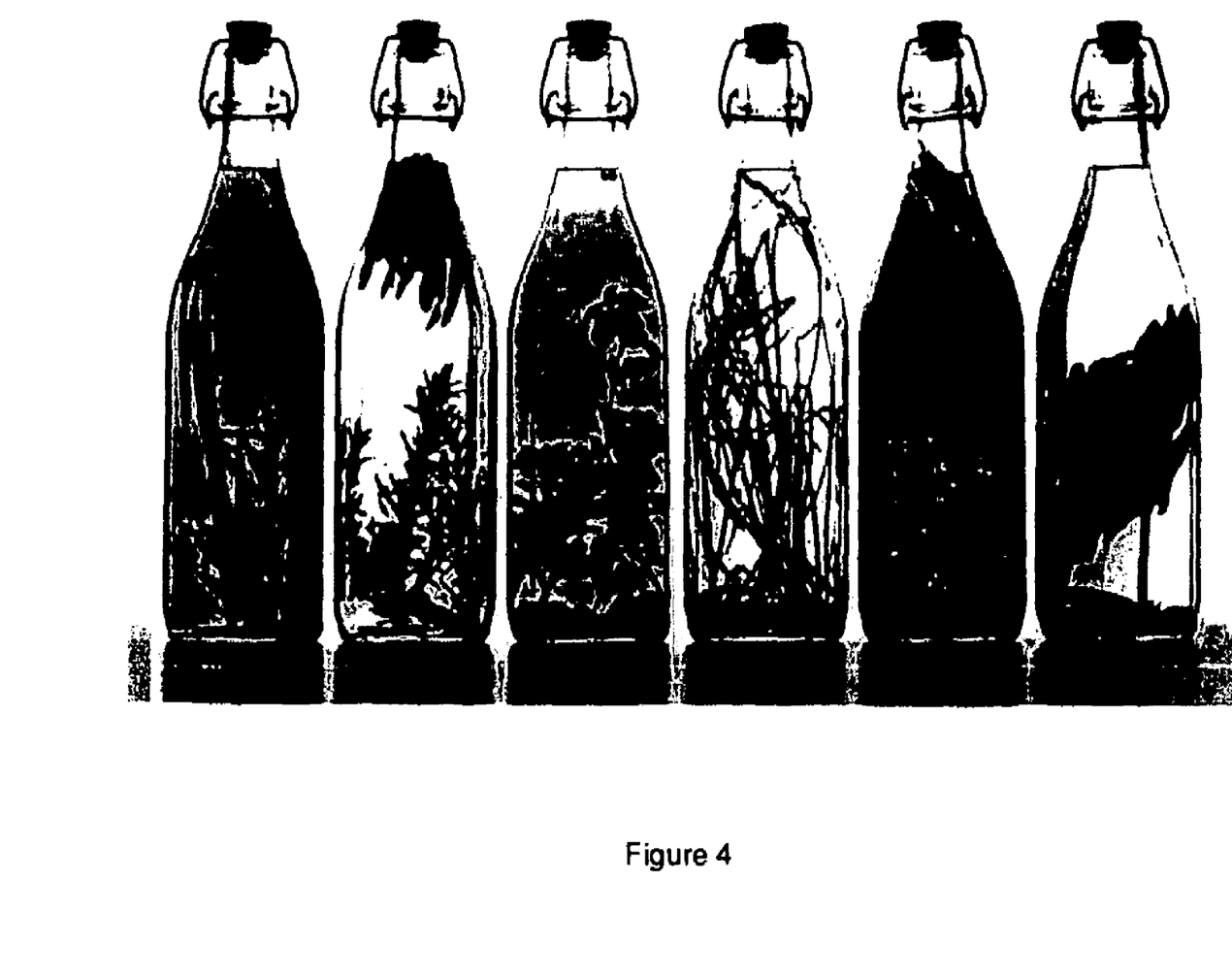
FIGS. 4 and 5 are a photograph and a corresponding digital painting.
Figure 5:
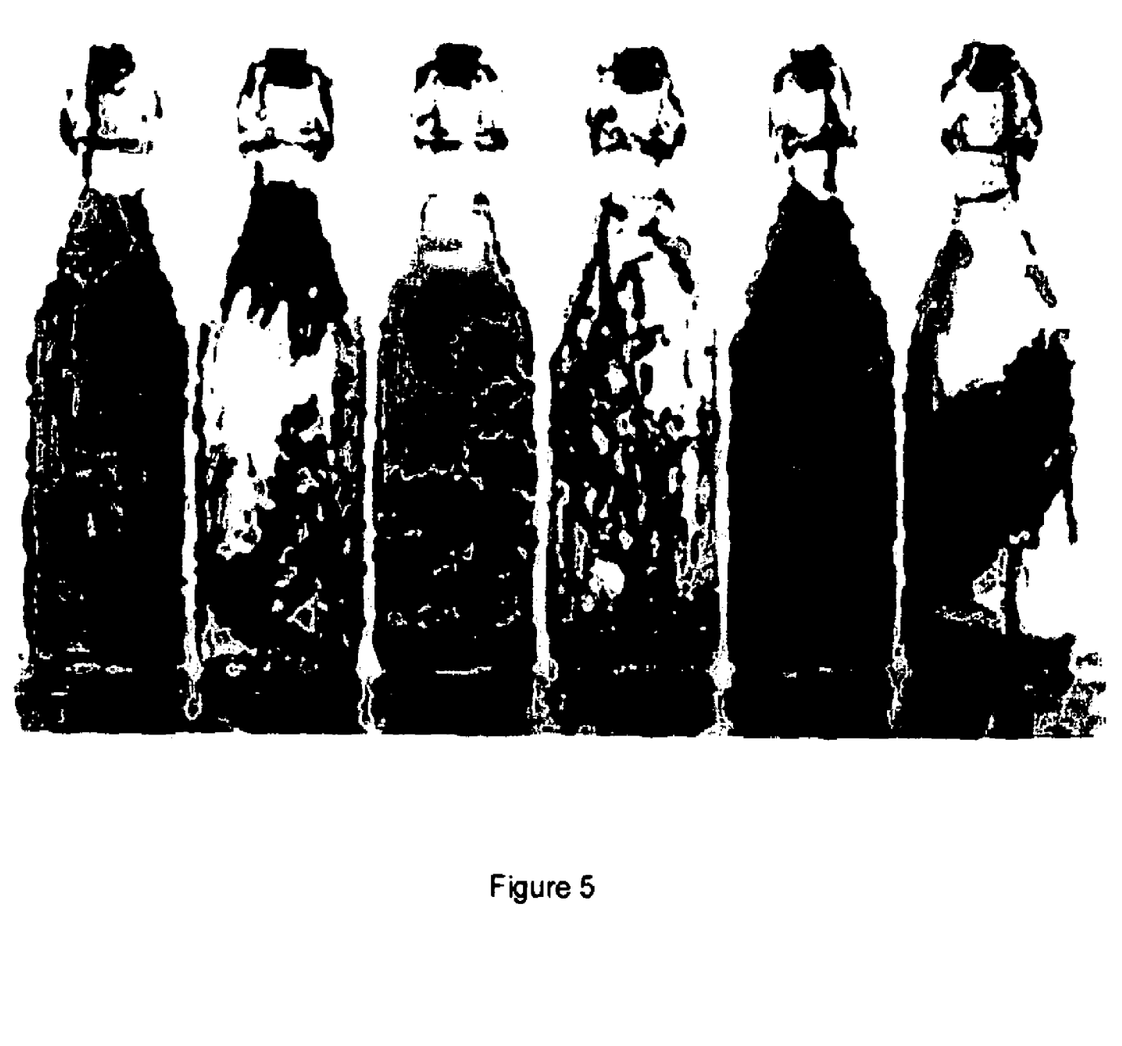
Figure 6:
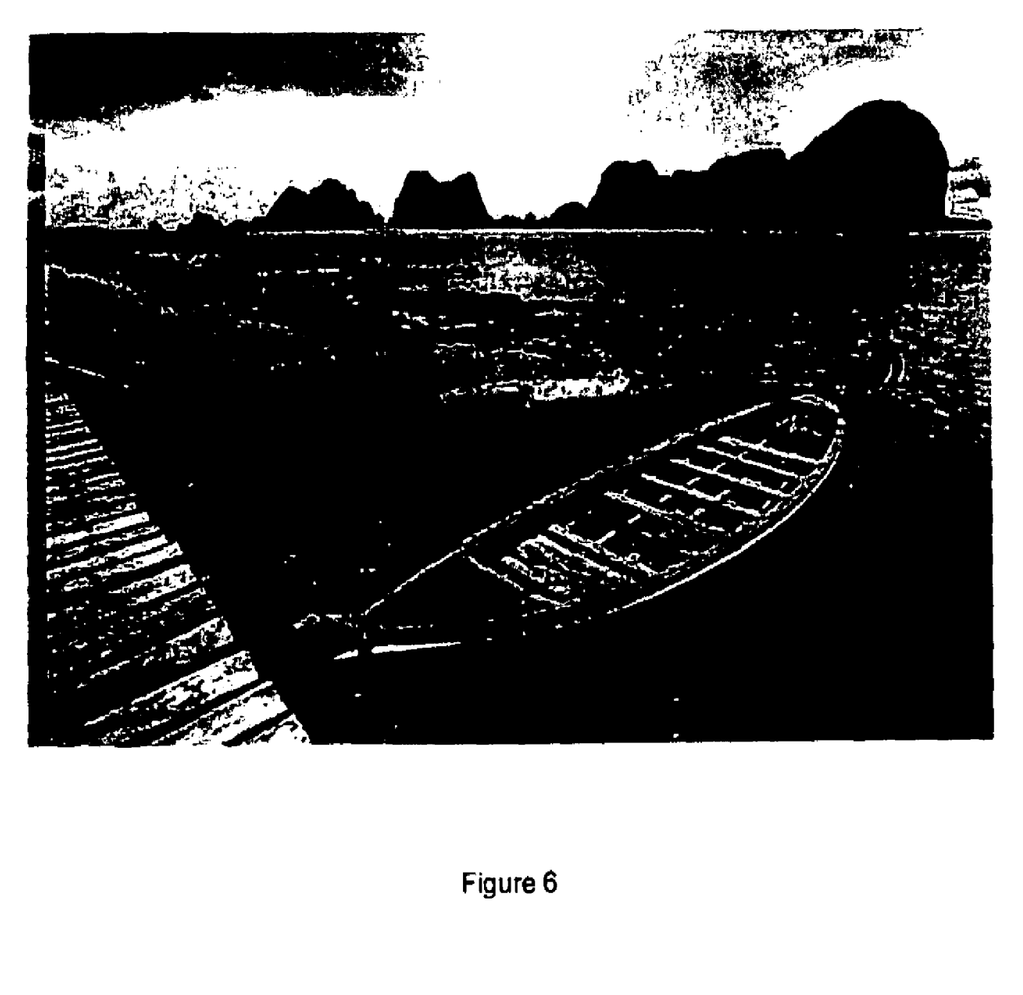
FIGS. 6, 7, and 8 are a photograph and corresponding expressionist and pointillist styles of digital paintings.
Figure 7:
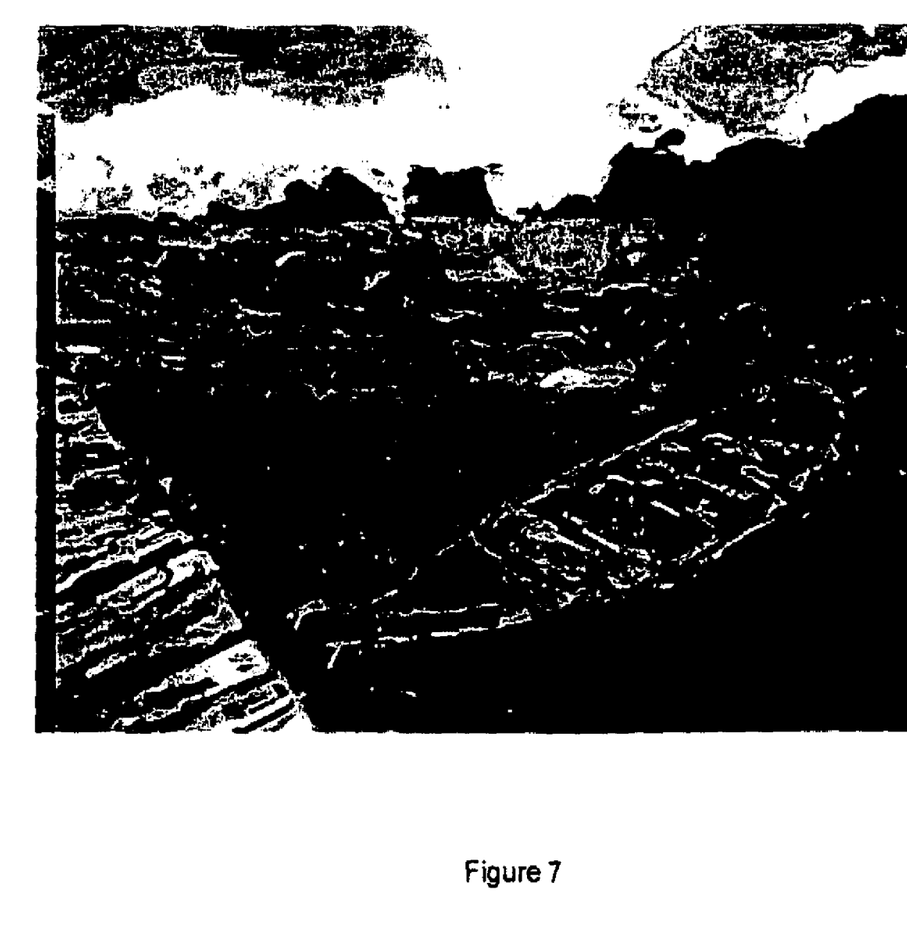
Figure 8:
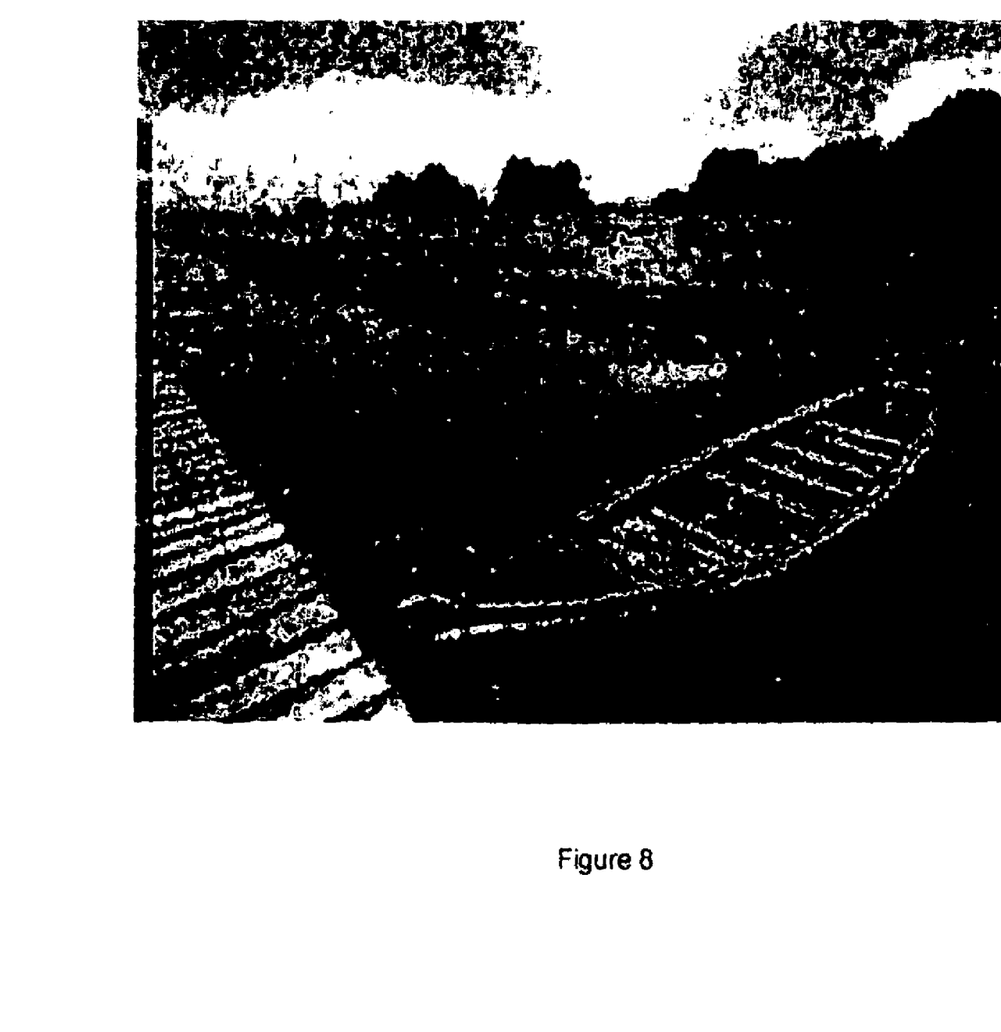

Examples of results that can be achieved using the invention are shown in FIGS. 4 through 8. FIG. 4 is a photograph of bottles. FIG. 5 is a digital painting created from the photograph. FIG. 6 is a photograph of a water scene. FIGS. 7 and 8 are expressionist and pointillist digital paintings that were created from FIG. 6.

What is claimed is:

1. A non-transitory medium bearing instructions to cause a machine to
   initialize a displayed canvas as a first image other than a solid color image, and
   receive indication of positions on the displayed canvas at which brush strokes are to be applied automatically based on a reference image that is different from the first image used to initialize the canvas, the reference image being other than a solid color image, wherein an aspect of style for a brush stroke is determined from the reference image;
   wherein the positions fall within an area of the displayed canvas indicated by an action performed using a user interface device, the indicated area being a proper subset of an entire area of the displayed canvas and having a corresponding area in the reference image, the corresponding area spanning multiple different regions of the reference image, and the aspect of style comprises different painting styles for the brush strokes selected in accordance with the different regions of the reference image.

2. The medium of claim 1 in which the instructions also cause the machine to receive input for specifying a style for the brush strokes.

3. The medium of claim 1 in which the size and/or an opacity of paint applied by brush strokes depends on pressure applied in a pressure sensitive pointing device.

4. The medium of claim 1 in which the instructions also cause the machine to receive input for specifying different brush stroke styles for different regions of the canvas.

5. The medium of claim 1 in which the instructions cause the machine to display a static copy of the reference image in a location that is separate from the canvas such that the reference image remains visible as the brush strokes are applied to the canvas.

6. The medium of claim 1 in which the instructions also cause the machine to:
   divide the reference image into distinct regions;
   measure image characteristics in each of the distinct regions; and
   select the different painting styles based on the image characteristics.

7. A non-transitory medium bearing instructions to cause a machine to
   receive indication of positions on a displayed canvas at which brush strokes are to be applied automatically based on a reference image, wherein an aspect of style for a brush stroke is determined from the reference image, and
   receive input for controlling tightness or looseness of alignment of brush strokes based on an edge of an object in the reference image, in which tight strokes align more tightly with the edge of the object and loose strokes align more loosely with the edge of the object;
   wherein the positions fall within an area of the displayed canvas indicated by an action performed using a user interface device, the indicated area being a proper subset of an entire area of the displayed canvas and having a corresponding area in the reference image, the corresponding area spanning multiple different regions of the reference image, and the aspect of style comprises different painting styles for the brush strokes selected in accordance with the different regions of the reference image.

8. The medium of claim 7 in which the instructions also cause the machine to
   receive input for specifying a style for the brush strokes.

9. The medium of claim 7 in which the size and/or an opacity of paint applied by brush strokes depends on pressure applied in a pressure sensitive pointing device.

10. The medium of claim 7 in which the instructions also cause the machine to receive input for specifying different brush stroke styles for different regions of the canvas.

11. The medium of claim 7 in which the instructions cause the machine to receive input for controlling the tightness or looseness of alignment of non-curl brush strokes.

12. The medium of claim 7 wherein the instructions cause the machine to receive input for controlling geometric configurations of the brush strokes, the geometric configurations including tight long, tight short, loose long, and loose short.

13. The medium of claim 7 wherein the instructions cause the machine to:
   divide the reference image into distinct regions;

measure image characteristics in each of the distinct regions; and select the different painting styles based on the image characteristics.

14. A non-transitory medium bearing instructions to cause a machine to receive indication of positions on a displayed digital canvas at which digital brush strokes are to be applied automatically based on a reference image, wherein an aspect of style for a brush stroke is determined from the reference image, and control a fidelity of color applied by the digital brush strokes based on pressure applied in a pressure sensitive pointing device;

wherein the positions fall within an area of the displayed canvas indicated by an action performed using a user interface device, the indicated area being a proper subset of an entire area of the displayed canvas and having a corresponding area in the reference image, the corresponding area spanning multiple different regions of the reference image, and the aspect of style comprises different painting styles for the brush strokes selected in accordance with the different regions of the reference image.

15. The medium of claim 14 in which the instructions also cause the machine to receive input for specifying a style for the brush strokes.

16. The medium of claim 14 in which the instructions also cause the machine to receive input for specifying different brush stroke styles for different regions of the canvas.

17. The medium of claim 14 in which the instructions also cause the machine to provide a tolerance control of a user interface that receives user input for determining how often the brush strokes are applied.

18. The medium of claim 17 in which the instructions also cause the machine to receive input for specifying a style for the brush strokes.

19. The medium of claim 17 in which the size and/or an opacity of paint applied by brush strokes depends on pressure applied in a pressure sensitive pointing device.

20. The medium of claim 17 in which the instructions also cause the machine to receive input for specifying different brush stroke styles for different regions of the canvas.

21. The medium of claim 14 in which the instructions also cause the machine to receive input for associating regions of the reference with respect styles in which the brush strokes are to be applied.

22. The medium of claim 21 in which the instructions also cause the machine to receive input for specifying a style for the brush strokes.

23. The medium of claim 21 in which the size and/or an opacity of paint applied by brush strokes depends on pressure applied in a pressure sensitive pointing device.

24. The medium of claim 21 in which the instructions also cause the machine to receive input for specifying different brush stroke styles for different regions of the canvas.

25. The medium of claim 14 wherein controlling the fidelity of color controls how colors of the brush stroke are chosen relative to the reference image.

26. The medium of claim 14 wherein the instructions cause the machine to receive input for controlling a tolerance of the brush strokes based on pressure applied in the pressure sensitive pointing device, the tolerance indicating whether and how often the brush strokes are applied based on a mismatch in the canvas and the reference image at a vicinity of a cursor.

27. The medium of claim 14 wherein the instructions cause the machine to:

divide the reference image into distinct regions;

measure image characteristics in each of the distinct regions; and select the different painting styles based on the image characteristics.

* * * * *